H. HASTINGS.
COMBINED FLUID LEVEL INDICATOR AND RESERVE VALVE.
APPLICATION FILED FEB. 25, 1921.
1,392,415. Patented Oct. 4, 1921.
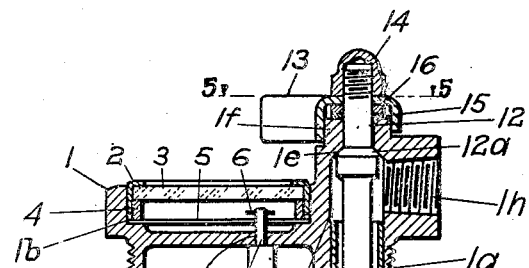
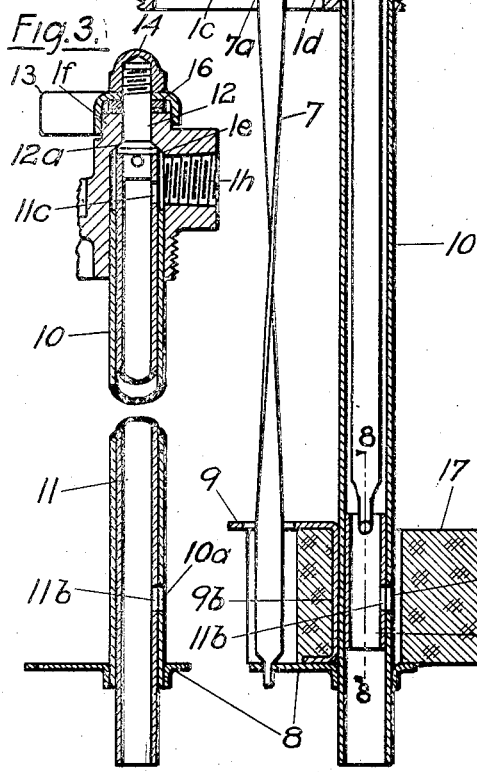
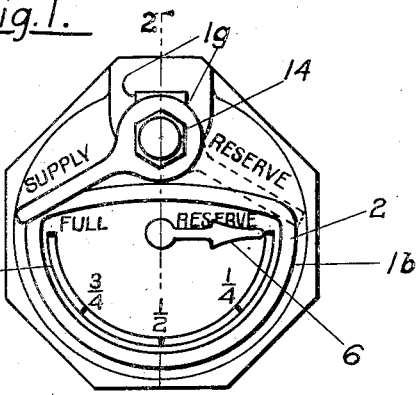
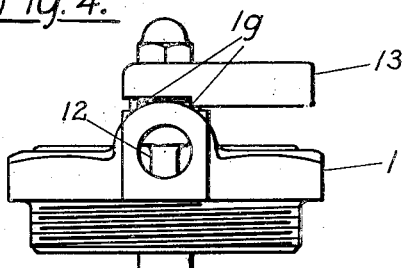
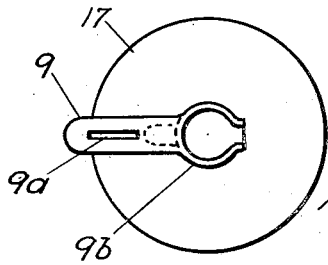

UNITED STATES PATENT OFFICE.

HERBERT HASTINGS, OF BRIGHTON, NEW YORK.

COMBINED FLUID-LEVEL INDICATOR AND RESERVE-VALVE.

1,392,415.  Specification of Letters Patent.  Patented Oct. 4, 1921.

Application filed February 25, 1921. Serial No. 447,899.

*To all whom it may concern:*

Be it known that I, HERBERT HASTINGS, a citizen of the United States, and a resident of Brighton, in the county of Monroe and State of New York, have invented a new and useful Improvement in a Combined Fluid-Level Indicator and Reserve-Valve.

This invention is particularly applicable to the gasolene tanks of automobiles and consists in combining in one instrument the two separate units heretofore provided, one unit for indicating the amount of gasolene in the tank and the other unit for making provision whereby a portion of the gasolene may be drawn out of the tank down to a predetermined reserve amount at which point the outlet flow will stop and the reserve will then become available by opening the reserve valve. My invention consists not in bringing together two separate and independent units in one fitting, but by designing each function of the combination so that fundamental parts of one unit become fundamental parts of the other and not an aggregation of independent parts.

The objects of my invention are to provide all of the advantages of two separate units in one instrument and to design the parts of each member of the combination so that necessary parts of one functional unit shall become necessary parts of the other functional unit and thus make for economy of manufacture and installation. Another object of my invention is an improved form of reserve valve and an improved form of float gage. Other objects and features of my invention will be understood in connection with the following description as illustrated in the accompanying drawings, in which—

Figure 1 is a plan view of the head of a combined indicator and reserve valve, embodying my invention.

Fig. 2 is a partial sectional view in elevation taken on line 2—2 of Fig. 1.

Fig. 3 is a fragmentary partial sectional view in elevation of a second form of reserve valve parts interchangeable with the reserve valve parts shown in Fig. 2.

Fig. 4 is a view in elevation of the head looking from the back or upper side of Fig. 1.

Fig. 5 is a sectional plan view of the lever and stem taken on the line 5—5 of Fig. 2.

Fig. 6 is a side elevational view of the lever shown in Fig. 5.

Fig. 7 is a plan view of the float and float plate shown in Fig. 2.

Fig. 8 is a partial sectional view of the gate and stem shown in Fig. 2, taken on the line 8—8 of Fig. 2.

Like characters of reference refer to like parts throughout the different views of the drawings.

1 is the head and is threaded at $1^a$ as a convenient means of mounting it in a tank fitting. The upper portion of the head is provided with a semi-circular recess $1^b$ adapted to receive a bezel 2 which retains the glass cover plate 3, spacing ring 4 and dial 5 therein thus forming a chamber between the dial and the glass for the free movement of the indicator 6. At the center of the semi-circular portion of the above recess a hole $1^c$ is provided in the bottom of the head and a slightly larger hole is also provided in the dial in line therewith and through these holes and having its bearing in the former the reduced portion $7^a$ of the spiral ribbon 7 projects and at the upper end thereof the indicator 6 is securely attached. The lower end of spiral 7 is supported in a foot piece 8. Operating along this spiral ribbon is a plate or metal shoe 9 carried by the float 17, and provided with an elongated hole $9^a$ through which the spiral passes and further provided with a tube shaped portion $9^b$ adapted to slide freely over the reserve valve tube 10 which latter performs the double function of supporting and guiding the float assembly and also serving as the gasolene uptake tube of the reserve valve. It will thus be seen that, as the float assembly is caused to rise or fall by a change of level of the surface of the gasolene on which it rides, the spiral will be made to turn a proportionate amount and the pointer will indicate that amount, when the float is at the top the pointer indicating "full" and at the bottom "reserve."

The reserve valve tube 10 is securely fixed in the hole $1^d$ in the head 1 and near the bottom end the foot piece 8 is securely fastened and a little above this a hole or port $10^a$ is provided in the side of the tube. On the inside of this tube in line with the port, is a tube or gate 11 which may be either a short tube wholly within the former as shown in Fig. 2. or a long tube extending beyond each end as shown in Fig. 3. This gate is provided with a port 11ª which is adapted to come into alinement with the port in the outer tube when the gate is turned to a certain position and to be completely out of communication therewith when turned to another position. A stem 12 is provided for turning the gate for opening and closing the ports and may be connected to the gate as shown in Figs. 3 and 8, and this stem is provided with an enlarged portion 12ª the upper part of which is provided with a conical surface fitting a conical seat 1ᵉ provided for it in the head and above this the stem projects through the head and carries the lever 13 which has an elongated hole 13ª to which the stem is fitted to insure the two members turning together, and a part of the stem projecting above the lever is threaded to receive a nut 14 which holds the lever on the stem. Around the stem and between the lever and the top of the boss or bearing 1ᶠ, is a flat washer 15 and a spring or lock washer 16 functioning so that when the nut 14 is tightened on the lever 13, the spring washer is compressed thus exerting an upward pull on the stem and holding the conical surface of the valve stem tight against the seat provided for it in the head and accomplishing a gasolene tight joint. In order to insure a proper registry of the port holes when the lever is in the "supply" position and non-registry in the "reserve" position the lever is provided with stop shoulders 13ᵇ which butt against the stop projections 1ᵍ on the head, thus limiting and determining the position of the lever and attached parts at both extremes of travel. In one side of the head above the tube 10 is a threaded hole 1ʰ communicating with the recess in the head above the tube and thus with the inside of the tube and serving as an outlet therefor, the gasolene passing around the lower part of the stem Fig. 2, and in Fig. 3 through the upper port hole 11ᶜ of tube 11. In operation the threaded hole 1ʰ is connected, by a pipe or tube, to a vacuum tank or equivalent, or to a carbureter or equivalent in a gravity or pressure system, and when the vacuum is applied, with the lever in the supply position, gasolene is drawn through the ports 10ª and 11ᵇ and through the passage above until the level of the gasolene comes down to the ports at which point air enters and breaks the flow of gasolene. The reserve supply or amount below the ports then becomes available by turning the lever to the "reserve" position closing the ports and the inlet of air and making the tube effective to its lower end. It will be understood that the control applies to either a gravity or pressure system.

Having thus described my invention in general what I claim as new and desire to secure by Letters Patent is

1. In combination a gage head, a fluid level indicator supported thereby, a tube supported in the head and projecting therefrom, said head being further provided with an outlet communicating with the tube.

2. In combination a gage head, a tube supported thereby, a float gage supported on the head and the tube and means for varying the pressure sustaining length of the tube.

3. In combination a gage head, a float indicator shaft and a tube supported therein, and provided with a fluid passage communicating with the tube, a valve operating shaft extending through the head into engagement with the tube for varying the effective tube length and means for maintaining fluid tight but movable engagement between said shaft and head.

4. In combination a gage head, a tube supported thereby, a float gage supported by the head and tube, a rod rotatably mounted in the head and engaging the tube for varying its effective length and means for maintaining a fluid tight contact between the rod and head.

5. In combination a gage head provided with a fluid passage there-through, a tube held in one end of the passage provided with a port, and means for opening and closing the port, a float indicating means supported by the head and the tube.

6. In combination a gage head provided with a bearing for an indicator stem, a bearing for a valve stem and a fluid passage; a tube supported at one end of the passage, an indicator stem journaled in said first named bearing and supported by the tube, a float adapted to produce rotation of the indicator stem and a valve stem journaled in said second named bearing.

7. In combination a gage head provided with an indicator stem bearing, a valve stem bearing, a fluid passage and a dial recess; a dial and cover mounted in said recess, a tube supported in one end of the passage, an indicator stem journaled in said first named bearing and supported by the tube, a float adapted to rotate the indicator stem and a valve stem journaled in the second named bearing.

8. In combination a gage head adapted to support an indicator stem, a valve stem and a tube and adapted to form a fluid passage outlet connecting with the tube; a tube provided with a port mounted in one end of said passage, a valve stem journaled in its said support and adapted to open and close said port and provided with means for indicating the open and closed relation, an indicator stem supported by the head and the tube, a float mounted to slide on the tube and adapted to operate the indicator stem.

9. In combination a gage head a portion of the top of which is adapted to receive the dial and dial housing parts of a float indicator and another portion of the top is adapted to provide a valve stem bearing and a valve controlled discharge outlet, a valve and valve stem mounted in the outlet and bearing and a float indicator supported by the head and valve.

HERBERT HASTINGS.

Witnesses:
E. M. CARMODY,
WM. MULCAHY.